US007853586B1

(12) United States Patent
Patel et al.

(10) Patent No.: US 7,853,586 B1
(45) Date of Patent: Dec. 14, 2010

(54) HIGHLIGHTING OCCURRENCES OF TERMS IN DOCUMENTS OR SEARCH RESULTS

(75) Inventors: Amit J. Patel, Cupertino, CA (US); David L. desJardins, Mountain View, CA (US)

(73) Assignee: Google Inc., Mountain View, CA (US)

( * ) Notice: Subject to any disclaimer, the term of this patent is extended or adjusted under 35 U.S.C. 154(b) by 815 days.

(21) Appl. No.: 10/965,714

(22) Filed: Oct. 18, 2004

Related U.S. Application Data

(63) Continuation of application No. 09/734,882, filed on Dec. 13, 2000, now Pat. No. 6,839,702.

(60) Provisional application No. 60/171,019, filed on Dec. 15, 1999.

(51) Int. Cl.
*G06F 7/00* (2006.01)
*G06F 17/30* (2006.01)

(52) U.S. Cl. .................. 707/722; 715/200; 715/821

(58) Field of Classification Search .......... 707/3, 707/722, 999.001, 999.003; 715/200, 821
See application file for complete search history.

(56) References Cited

U.S. PATENT DOCUMENTS

| 5,220,625 | A | * | 6/1993 | Hatakeyama et al. ....... 715/809 |
| 5,644,737 | A | * | 7/1997 | Tuniman et al. ........... 715/810 |
| 5,946,678 | A | * | 8/1999 | Aalbersberg ............... 707/3 |
| 5,982,370 | A | * | 11/1999 | Kamper .................. 715/760 |
| 6,006,217 | A | * | 12/1999 | Lumsden ................. 707/2 |
| 6,009,459 | A | * | 12/1999 | Belfiore et al. ............ 709/203 |
| 6,012,055 | A |   | 1/2000 | Campbell et al. |
| 6,098,081 | A |   | 8/2000 | Heidorn et al. |
| 6,112,202 | A |   | 8/2000 | Kleinberg ................ 707/5 |
| 6,154,757 | A | * | 11/2000 | Krause et al. ............. 715/205 |
| 6,332,148 | B1 | * | 12/2001 | Paine et al. .............. 715/236 |
| 6,397,218 | B1 |   | 5/2002 | Stern et al. ............... 707/10 |
| 6,510,406 | B1 |   | 1/2003 | Marchisio ................ 704/9 |
| 6,785,670 | B1 |   | 8/2004 | Chiang et al. |
| 6,834,276 | B1 | * | 12/2004 | Jensen et al. ............. 707/2 |
| 6,839,702 | B1 |   | 1/2005 | Patel et al. .............. 707/3 |
| 6,968,332 | B1 |   | 11/2005 | Milic-Frayling et al. |

OTHER PUBLICATIONS

Daniel Knaus, Elke Mittendorf, Peter Schaube, and Paraic Sheridan, Highlighting Relevant Passages for Users of the Interactive SPIDER Retrieval System, 1995, Swiss Federal Institute of Technology.*

Michelle Q. Wang Baldonado et al.; "Hi-Cites: Dynamically Created Citations with Active Highlighting" Proceedings of the SIGCHI conference on Human factors in computing systems; Jan. 1998; pp. 408-415.

(Continued)

*Primary Examiner*—James Trujillo
*Assistant Examiner*—Jeffrey Burke
(74) *Attorney, Agent, or Firm*—Harrity & Harrity, LLP

(57) ABSTRACT

A system highlights search terms in documents distributed over a network. The system generates a search query that includes a search term and, in response to the search query, receives a list of one or more references to documents in the network. The system receives selection of one of the references and retrieves a document that corresponds to the selected reference. The system then highlights the search term in the retrieved document.

16 Claims, 10 Drawing Sheets

OTHER PUBLICATIONS

Ali Hussam et al.; "Semantic Highlighting"; CHI 98 conference summary on Human factors in computing systems; Apr. 1998; pp. 191-192.
Amit J. Patel et al.; U.S. Appl. No. 11/008,262; Systems and Methods for Highlighting Search Results; filed Dec. 10, 2004.
Non-final Office Action from U.S. Appl. No. 11/008,262, dated Dec. 23, 2008, 21 pages.
Non-final Office Action from U.S. Appl. No. 11/008,262 dated Mar. 8, 2007, 10 pages.
Final Office Action from U.S. Appl. No. 11/008,262 dated Aug. 10, 2007, 11 pages.
Office Action from U.S. Appl. No. 11/008,262, dated Jun. 4, 2009, 17 pages.

* cited by examiner

HIGHLIGHTING OCCURRENCES OF TERMS IN DOCUMENTS OR SEARCH RESULTS

RELATED APPLICATION

This application is a continuation of U.S. patent application Ser. No. 09/734,882, filed Dec. 13, 2000, now U.S. Pat. No. 6,839,702, which claims the benefit of U.S. Provisional Application No. 60/171,019, filed Dec. 15, 1999, the disclosures of which are incorporated herein by reference.

BACKGROUND OF THE INVENTION

A. Field of the Invention

The present invention relates generally to information retrieval systems and, more particularly, to systems and methods for highlighting query terms in search results.

B. Description of Related Art

Conventional techniques for searching a hypertext medium, such as the World Wide Web ("web"), are replete with deficiencies. To perform a search on the web, a user typically uses a web browser, such as the Netscape Navigator and Microsoft Internet Explorer browsers. The user enters one or more search terms into the browser. In response, the browser generates a query request to a search engine. The search engine typically returns a list of result links to the browser, which, in turn, displays the list to the user.

To view a document associated with one of the links, the user typically selects the link by, for example, clicking on it using a mouse. Sometimes, the user desires to determine where the search terms are located in the document to determine the document's relevance. Conventional information retrieval systems require that the user perform a word search on the document to locate each occurrence of the search terms.

As a result, there exists a need for mechanisms for highlighting search terms in a retrieved document to aid a user in determining the document's relevance.

SUMMARY OF THE INVENTION

Systems and methods, consistent with the present invention, address this and other needs by providing mechanisms for highlighting search terms in retrieved documents to facilitate the determination of the documents' relevance.

In accordance with the purpose of the invention as embodied and broadly described herein, a system highlights search terms in documents distributed over a network. The system generates a search query that includes a search term and, in response to the search query, receives a list of one or more references to documents in the network. The system receives selection of one of the references and retrieves a document that corresponds to the selected reference. The system then highlights the search term in the retrieved document.

In another implementation consistent with the present invention, a web browser includes instructions for obtaining a search term; instructions for generating a search query from the search term; and instructions for obtaining a list of one or more references to documents distributed over a network using the search query. The web browser further includes instructions for retrieving a document corresponding to one of the one or more references; instructions for highlighting each occurrence of the search term in the retrieved document; and instructions for displaying the highlighted document to a user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, highlight search terms in documents retrieved as a result of a search to aid in the determination of the relevancy of the retrieved documents.

Exemplary Network with Browser Assistant

Figure 1:
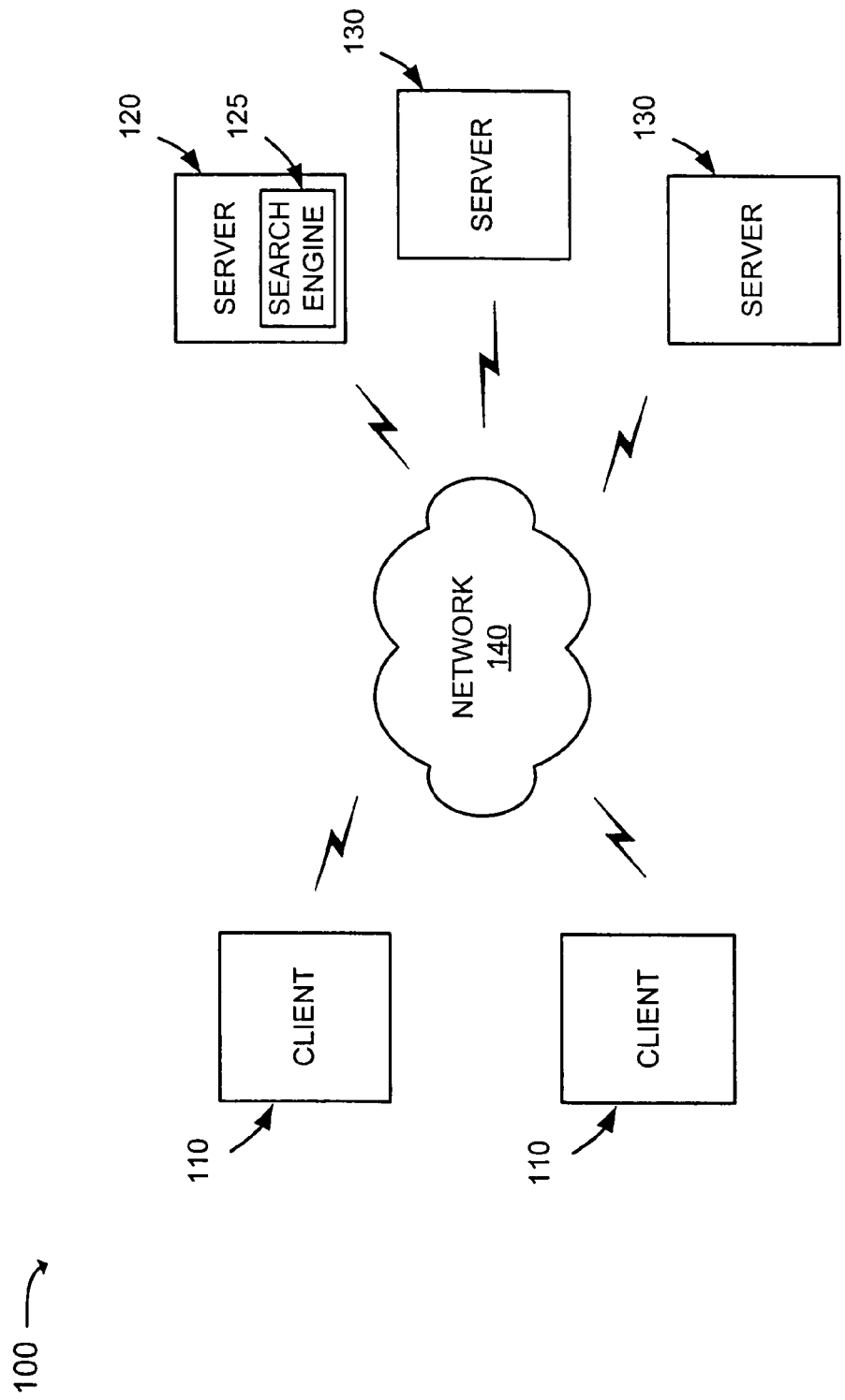
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120-130 via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120-130 have been illustrated as connected to network 140 for simplicity. In practice, there may be more or less clients and servers. Also, in some instances, a client may perform the functions of a server and a server may perform the functions of a client.

The clients 110 may include devices, such as wireless telephones, personal computers, personal digital assistants (PDAs), lap tops, etc., threads or processes running on these devices, and/or objects executable by these devices. The servers 120-130 may include server devices, threads, and/or objects that operate upon, search, or maintain documents in a manner consistent with the present invention. The clients 110 and servers 120-130 may connect to the network 140 via wired, wireless, or optical connections.

In an implementation consistent with the present invention, the server 120 may include a search engine 125 usable by the clients 110. The servers 130 may store documents accessible by the clients 110.

Exemplary Client Architecture

Figure 2:
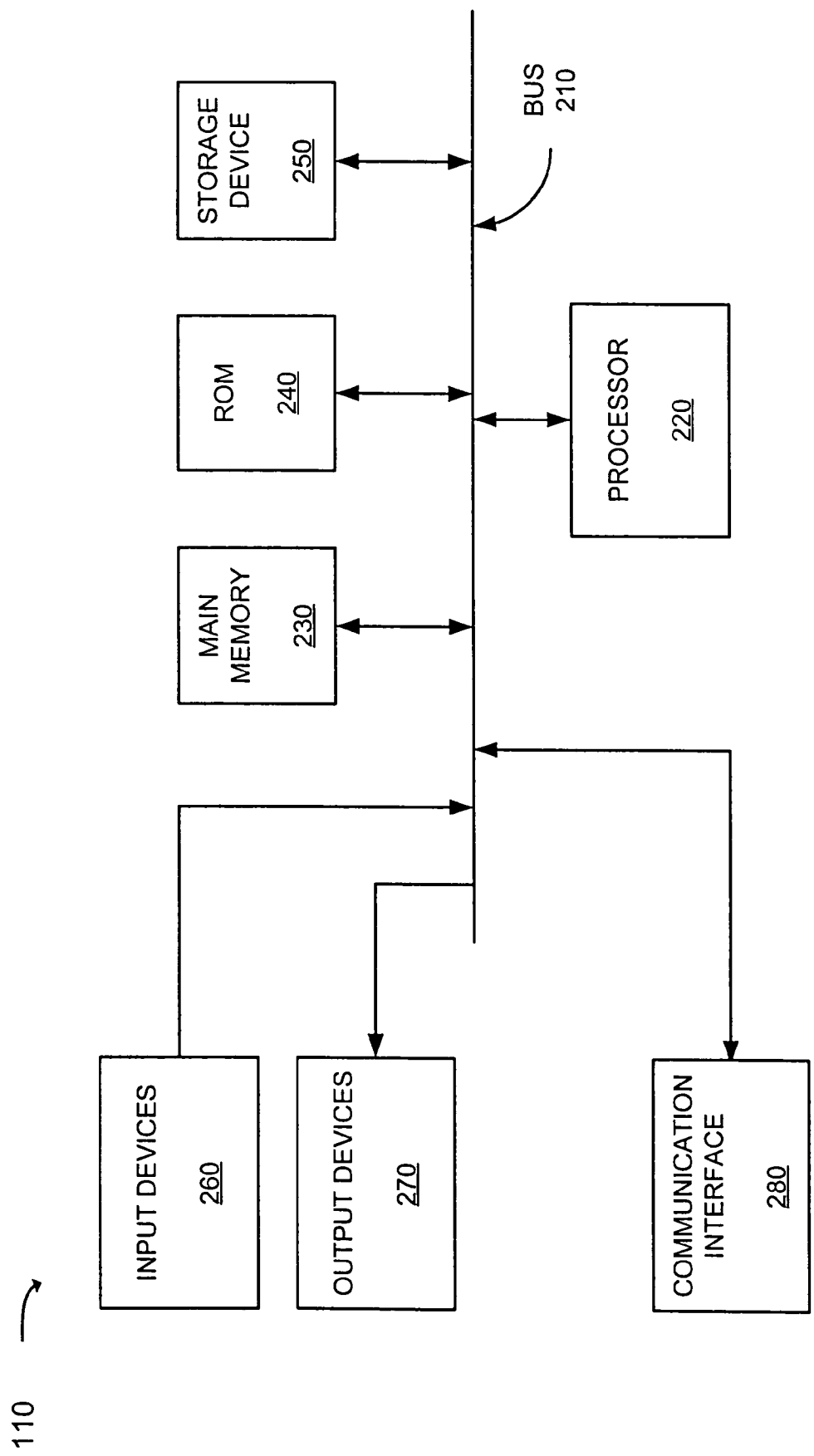
FIG. 2 is an exemplary diagram of a client of FIG. 1 in an implementation consistent with the present invention.

FIG. 2 is an exemplary diagram of a client 110 in an implementation consistent with the present invention. The client 110 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the client 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit a user to input information to the client 110, such as a keyboard, a mouse, a pen, voice recognition and/or biometric mechanisms, etc. The output devices 270 may include one or more conventional mechanisms that output information to the user, including a display, a printer, a speaker, etc. The communication interface 280 may include any transceiver-like mechanism that enables the client 110 to communicate with other devices and/or systems. For example, the communication interface 280 may include mechanisms for communicating with another device or system via a network, such as network 140.

As will be described in detail below, the clients 110, consistent with the present invention, perform certain searching-related operations. The clients 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Computer-Readable Medium

Figure 3:
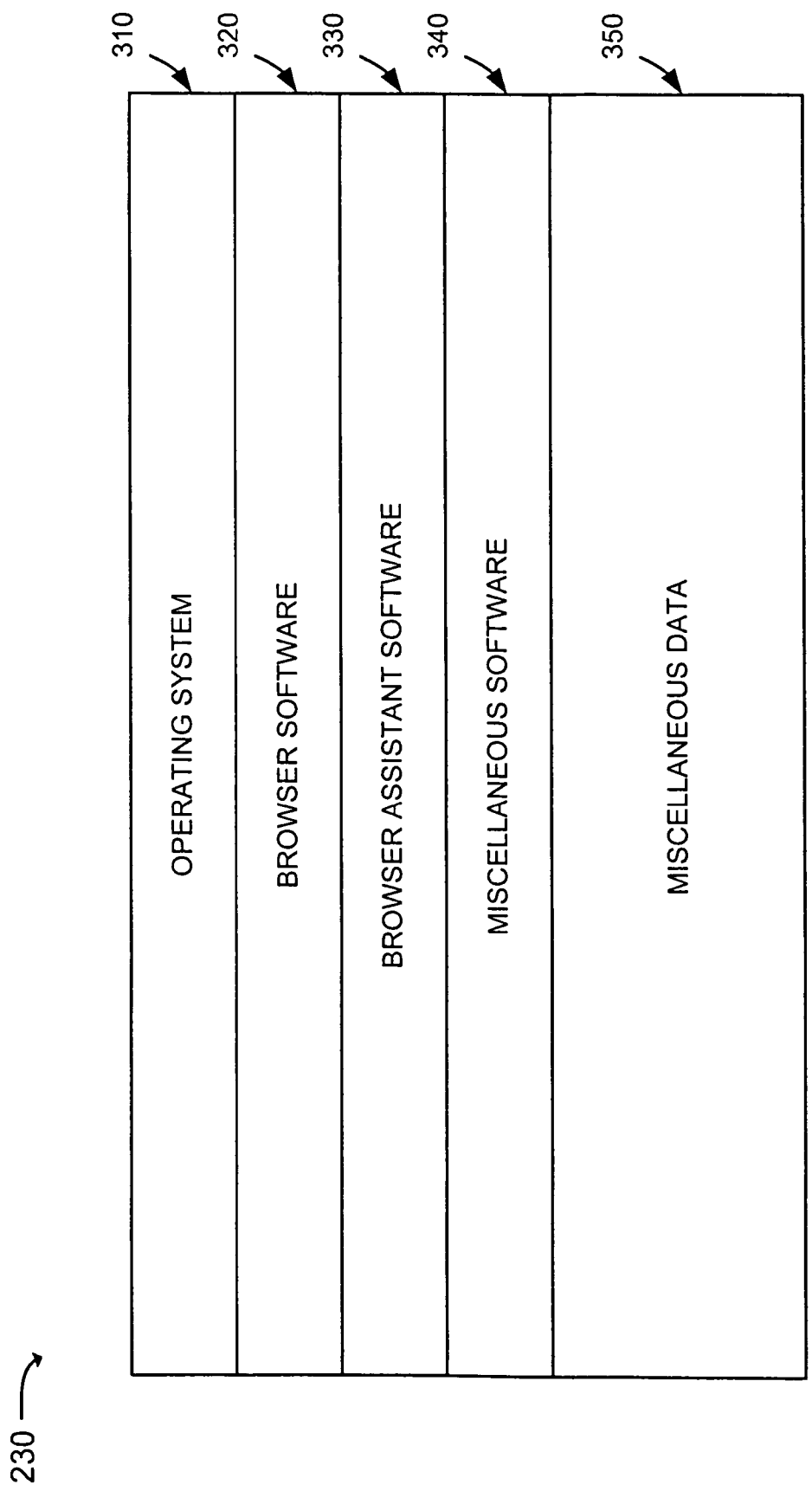
FIG. 3 is a diagram of an exemplary computer-readable medium used by the clients of FIG. 1 according to an implementation consistent with the present invention.

FIG. 3 is a diagram of an exemplary computer-readable medium used by the clients 110 according to an implementation consistent with the present invention. In this implementation, the computer-readable medium includes memory 230. The memory 230 may include an operating system 310, browser software 320, browser assistant software 330, miscellaneous other software 340, and miscellaneous data 350.

The operating system 310 may include conventional operating system software, such as the Windows, Unix, or Linux operating systems. The browser software 320 may include conventional web browser software, such as the Microsoft Internet Explorer or Netscape Navigator browsers.

The browser assistant software 330 may include a plug-in, an applet, a dynamic link library (DLL), or a similar executable object or process. The client 110 may obtain the plug-in from the server 120 or from a third party server, disk, tape, network, CD-ROM, etc. Alternatively, the plug-in may be pre-installed on the client 110.

In another implementation consistent with the present invention, the browser assistant 330 is part of the browser 320. In this implementation, the browser 320 performs the functions of the browser assistant 330. In yet another implementation, the browser assistant 330 is a process separate from and runs concurrently with the browser 320. In this implementation, the browser assistant 330 may interface between the browser 320 and the network 140.

The browser assistant 330 may be automatically activated upon initiation of the browser 320. Alternatively, the browser assistant 330 may be activated when instructed by a user. In either case, the browser assistant 330 may take the form of a graphical user interface, such as a tool bar, software button, or menu, that provides an extension to the browser 320.

Figure 4:
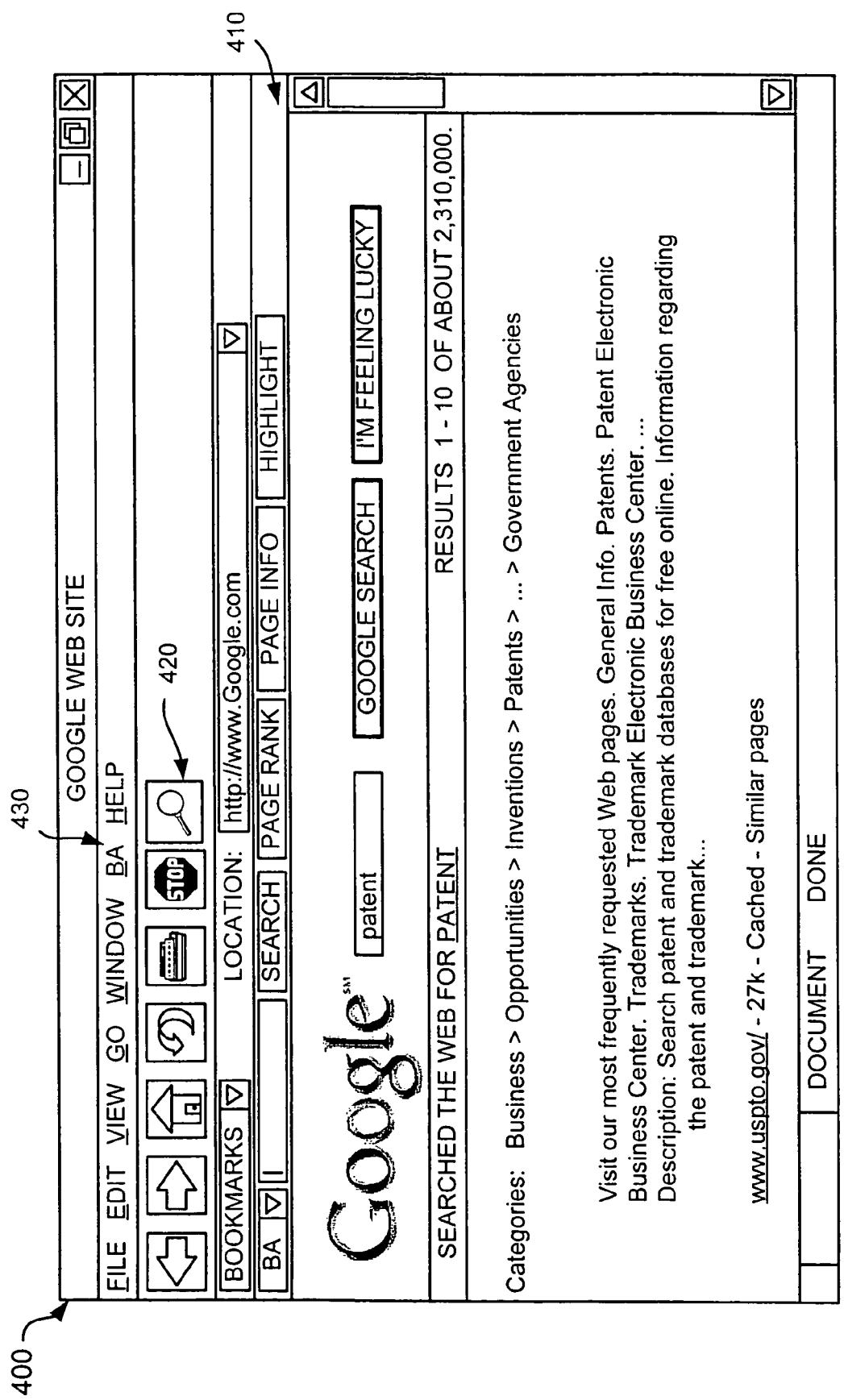
FIG. 4 is an exemplary diagram of a graphical user interface that includes the browser assistant of FIG. 3 according to an implementation consistent with the present invention.

FIG. 4 is an exemplary diagram of a graphical user interface 400 that includes a browser assistant (BA) 330 according to an implementation consistent with the present invention. The graphical user interface 400 illustrated in FIG. 4 shows three forms of the browser assistant 330: a tool bar 410, a software button 420, and a menu 430. The browser assistant 330 may take other forms.

The tool bar 410 includes software buttons and/or menus selectable by a user to initiate different functions of the browser assistant 330. In this case, a user may activate a function of the browser assistant 330 by selecting one of the software buttons and/or menus. The software button 420 may be selectable by a user to initiate the browser assistant 330 functionality. In this case, a user may activate a function of the browser assistant 330 by selecting the button using, for example, a mouse. The menu 430 may provide a list of functions that the browser assistant 330 is capable of performing. A user may select from the list to activate the browser assistant 330 and instruct the browser assistant 330 to perform the desired function.

As described in more detail below, the browser assistant 330 may perform many searching-related functions to enhance a user's search experience. The browser assistant 330 may attach to the browser 320 to provide additional functionality to the user.

Returning to FIG. 3, the miscellaneous other software 340 and miscellaneous data 350 may include programs and data used by the client 110 to perform searching-related and non-searching-related operations.

Exemplary Server Architecture

Figure 5:
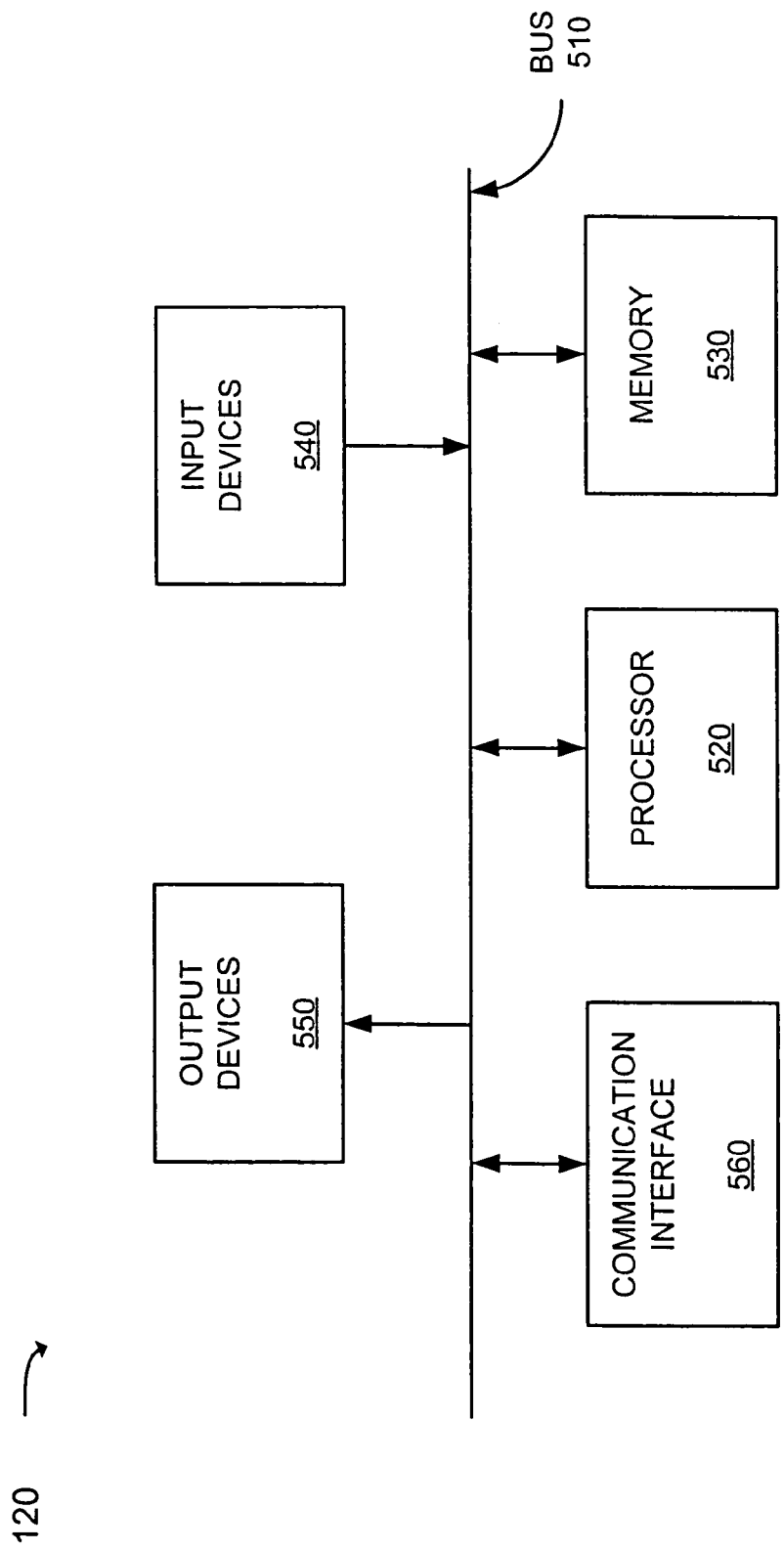
FIG. 5 is an exemplary diagram of a server of FIG. 1 according to an implementation consistent with the present invention.

FIG. 5 is an exemplary diagram of the server 120 according to an implementation consistent with the present invention. The servers 130 may be similarly configured.

The server 120 may include a bus 510, a processor 520, a memory 530, one or more input devices 540, one or more output devices 550, and a communication interface 560. The bus 510 permits communication among the components of the server 120. The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some other type of magnetic or optical recording medium and its corresponding drive.

The input devices 540 may include one or more conventional mechanisms that permit an operator to input information into the server 120, such as a keyboard, mouse, pen, etc. The output devices 550 may include one or more conventional mechanisms that output information to the operator, including a display, a printer, a speaker, etc. The communication interface 560 may include any transceiver-like mechanism that enables the server 120 to communicate with other devices and systems via a network, such as the network 140.

As will be described in detail below, the server 120, consistent with the present invention, performs certain searching-related operations. The server 120 may perform these operations in response to processor 520 executing software instructions contained in a computer-readable medium, such as memory 530. The software instructions may be read into memory 530 from another computer-readable medium or from another device via the communication interface 560. The software instructions contained in memory 530 causes processor 520 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Processing for Highlighting Search Results Using Browser Assistant

Figure 6:
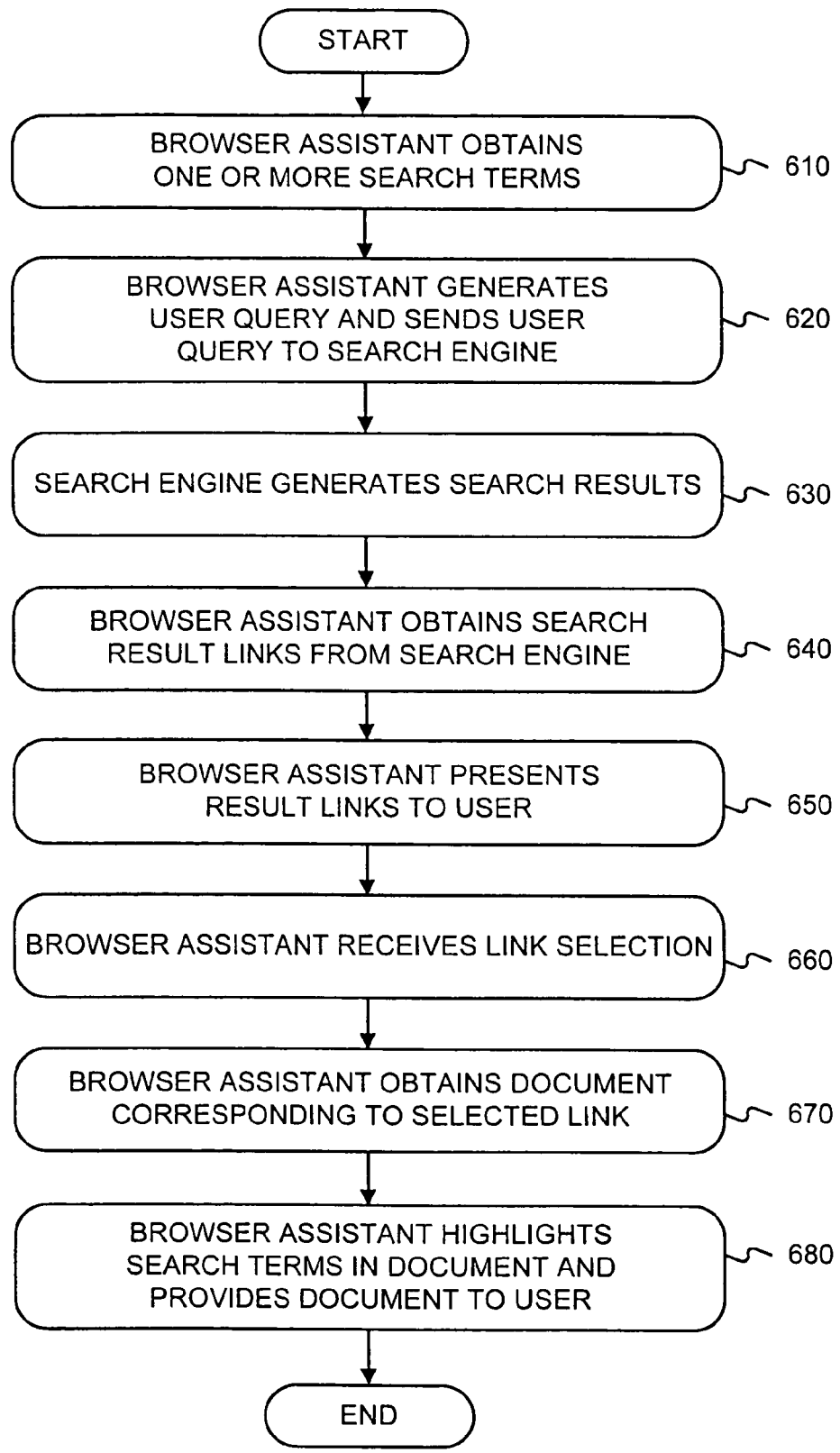
FIG. 6 is a flowchart of exemplary processing for highlighting search results in accordance with an implementation consistent with the present invention.

FIG. 6 is a flowchart of exemplary processing for highlighting search results in accordance with an implementation consistent with the present invention. Processing may begin with a user activating web browser software, such as browser 320 (FIG. 3), and browser assistant software, such as browser assistant 330, on a client, such as client 110 (FIG. 1). The user may then provide one or more search terms to the browser assistant 330 [act 610]. The user may do this, for example, by entering the search terms at an appropriate place in the graphical user interface of the browser assistant 330. In an implementation consistent with the present invention, a group of search terms may be provided as a phrase or as part of a Boolean expression.

The browser assistant 330 may treat the search terms as a query to a search engine, such as the search engine 125 or a web directory. The browser assistant 330 may generate a request to query the search engine 125 using the search terms and send the request to the search engine 125 [act 620]. In response to the request, the search engine 125 generates data that contains the search results and sends it back to the browser assistant 330 [act 630]. The search engine 125 may provide the search results as a HyperText Markup Language (HTML) document, similar to search results provided by conventional search engines. Alternatively, the search engine 125 may provide the search results according to a protocol agreed upon by the search engine 125 and the browser assistant 330.

In an implementation consistent with the present invention, the search results include references to documents (e.g., web pages), such as links to the documents and possibly a textual description of the links. In another implementation, the search results include references to directory nodes within a hierarchical directory, such as links to the directory nodes and possibly textual descriptions for the directory nodes. In other implementations, the search results include a combination of these references.

The browser assistant 330 receives the list of result links from the search engine 125 [act 640]. If the list of result links takes the form of an HTML document, then the browser assistant 330 may parse the document to determine the links that form the search results.

The browser assistant 330 may present the result links to the user [act 650]. For example, the browser assistant 330 may highlight the search terms in the result links and/or any textual descriptions associated with the result links and present the result links as a web page in a browser window. Alternatively, the browser assistant 330 may present the result links as a list of selectable items within a user interface of the browser assistant 330. In one instance, the user interface of the browser assistant 330 may include a pull-down or pop-up menu. In another instance, the user interface may include a side-bar or a scrolling list.

The user may then select one of the links to retrieve a document corresponding to the link. The user may make the selection, for example, by clicking on one of the links using a pointer, such as a mouse pointer. The browser assistant 330 detects the link selection and retrieves the corresponding document from a server, such as server 130, in the network 140 [acts 660 and 670].

The browser assistant 330 may then highlight the search terms in the document [act 680]. For example, the browser assistant 330 may search the document to locate the search terms. Then for each occurrence of the search terms, the browser assistant 330 may change one or more characteristics of the word(s), such as the font, style, size, color, effect, etc.

The browser assistant 330 may then present the document, with the highlighted search terms, to the user [act 680]. For example, the browser assistant 330 may display the document as a web page in a browser window or via a pop-up window.

Figure 7:
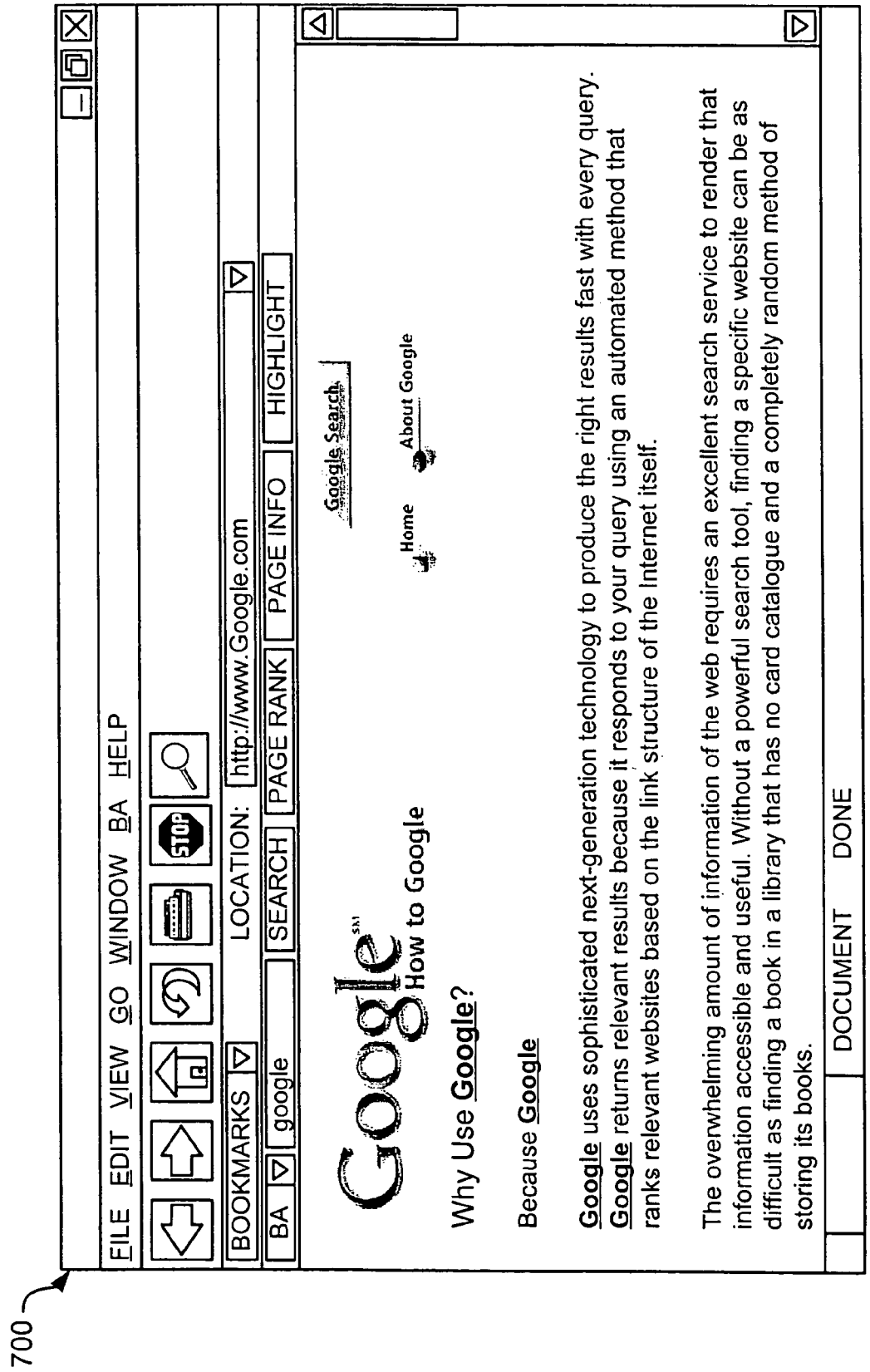
FIG. 7 is a diagram of an exemplary graphical user interface that displays a document with highlighted search terms according to an implementation consistent with the present invention.

FIG. 7 is a diagram of an exemplary graphical user interface 700 that displays a document with highlighted search terms in a manner consistent with the present invention. In this example, the user has searched for the term "google" and has selected a link on the Google web site for a document relating to "How to Google." As shown, the browser assistant 330 highlights each occurrence of the word "google" in the document. Any conventional highlighting technique may be used. For example, as illustrated in FIG. 7, the browser assistant 330 may underline each occurrence of the search term.

Figure 8:
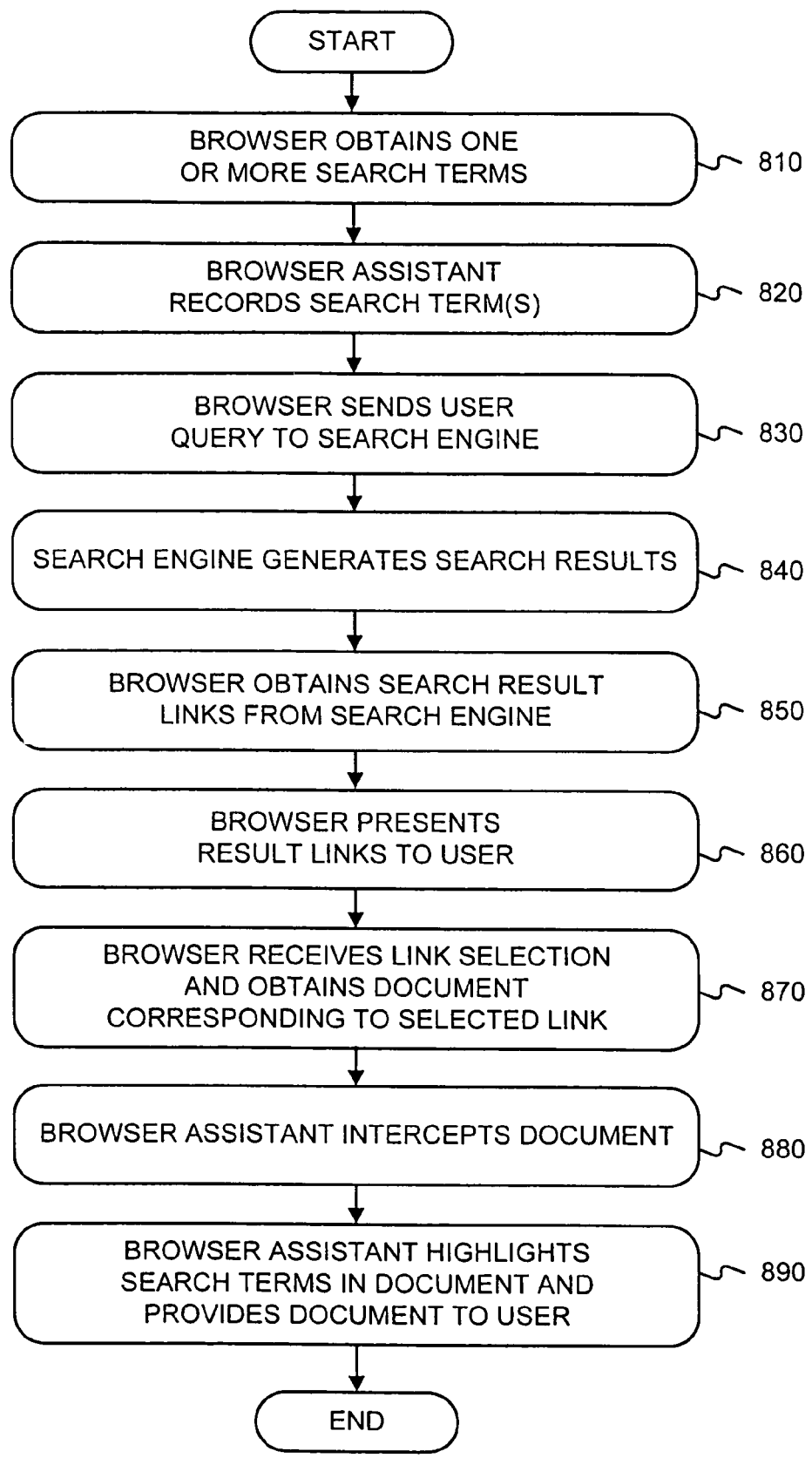
FIG. 8 is a flowchart of exemplary processing for highlighting search results in accordance with an alternate implementation consistent with the present invention.

FIG. 8 is a flowchart of exemplary processing for highlighting search results in accordance with an alternate implementation consistent with the present invention. In this alternate implementation, processing may begin with a user activating web browser software, such as browser 320 (FIG. 3), and browser assistant software, such as browser assistant 330, on a client, such as client 110 (FIG. 1). The user may provide an address, such as a Uniform Resource Locator (URL), to the browser 320 to access a search engine, such as the search engine 125, or a web directory in a conventional manner.

The user may then provide one or more search terms to the browser 320 in a conventional manner [act 810]. The browser assistant 330 may record the search terms for use in a manner described below [act 820].

The browser 320 may treat the search terms as a query to the search engine 125 or the web directory. The browser 320 may generate a request to query the search engine 125 using the search terms and send the request to the search engine 125 [act 830]. In response to the request, the search engine 125 generates data that contains the search results and sends it back to the browser 320 [act 840].

As described above, the search results may include links to documents (e.g., web pages) and possibly a textual description of the links, links to directory nodes within a hierarchical directory and possibly textual descriptions for the directory nodes, or a combination of these links.

The browser 320 receives the list of result links from the search engine 125 [act 850]. If the list of result links takes the form of an HTML document, then the browser 320 may parse the document to determine the links that form the search results. The browser 320 may present the result links to the user in a conventional manner [act 860].

The user may then select one of the links to retrieve a document corresponding to the link. The user may make the selection, for example, by clicking on one of the links using a pointer, such as a mouse pointer. The browser 320 detects the link selection and retrieves the corresponding document from a server, such as server 130, in the network 140 [act 870].

The browser assistant 330 may intercept the document [act 880]. The browser assistant 330 may then highlight the search terms in the document and present the highlighted document to the user instead of or in addition to the unhighlighted document [act 890]. For example, the browser assistant 330 may search the document to locate the search terms. Then for each occurrence of the search terms, the browser assistant 330 may change one or more characteristics of the word(s), such as the font, style, size, color, effect, etc.

Exemplary Network without Browser Assistant

Figure 9:
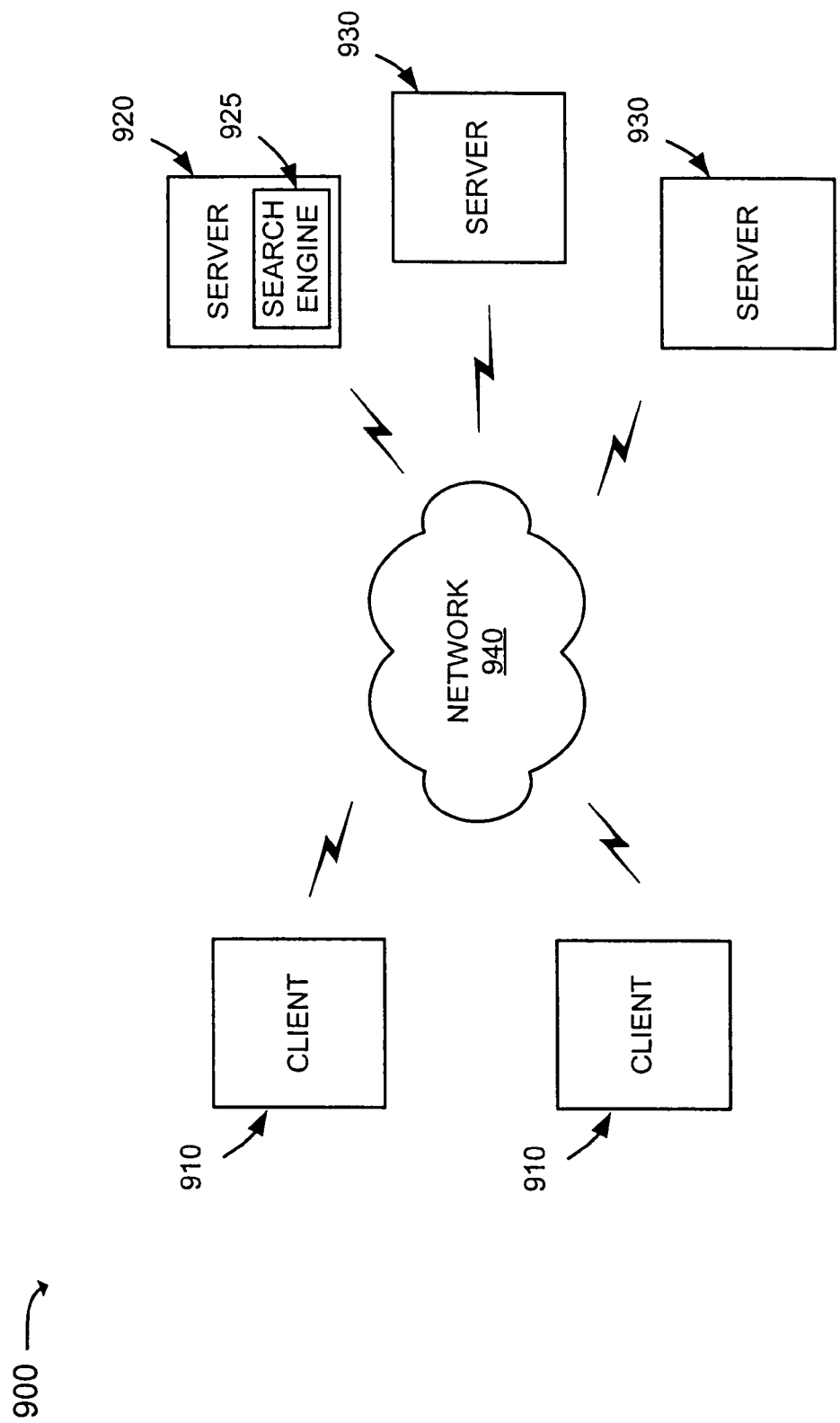
FIG. 9 is an exemplary diagram of an alternate network in which systems and methods consistent with the present invention may be implemented.

FIG. 9 is an exemplary diagram of an alternate network 900 in which systems and methods consistent with the present invention may be implemented. The network 900 may include multiple clients 910 connected to multiple servers 920-930 via a network 940. The network 940 may include a LAN, a WAN, a telephone network, such as the PSTN, an intranet, the Internet, a similar or dissimilar network, or a combination of networks. The clients 910 and servers 920-930 may connect to the network 940 via wired, wireless, or optical connections. Two clients 910 and three servers 920-930 have been illustrated as connected to network 940 for simplicity. In practice, there may be more or less clients and servers. Also, in some instances, a client may perform the functions of a server and a server may perform the functions of a client.

The clients 910 may include devices, such as wireless telephones, personal computers, PDAs, lap tops, etc., threads or processes running on these devices, and/or objects executable by these devices. The clients 910 may be configured similar to the clients 110 in FIG. 1. Unlike the clients 110, however, the clients 910 do not include browser assistant software.

The servers 920-930 may include server devices, threads, and/or objects that operate upon, search, or maintain documents in a manner consistent with the present invention. The server 920 may include an enhanced search engine 925 and may be configured similar to the server 120 in FIG. 1. The servers 930 may also be configured similar to the servers 130 in FIG. 1.

Figure 10:
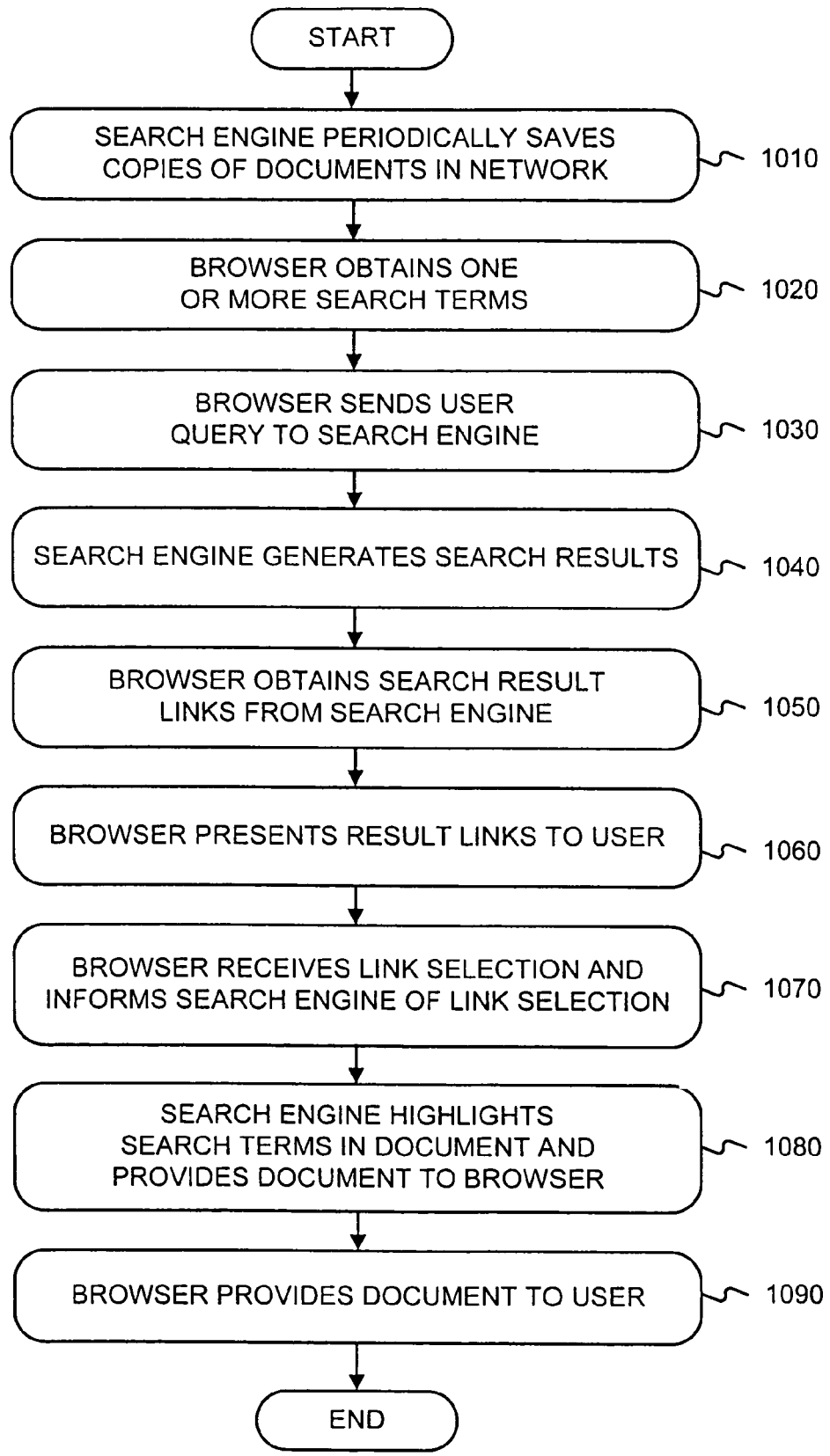
FIG. 10 is a flowchart of exemplary processing for highlighting search results in accordance with another implementation consistent with the present invention.

Exemplary Processing for Highlighting Search Results without Using Browser Assistant FIG. 10 is a flowchart of exemplary processing for highlighting search results in accordance with another implementation consistent with the present invention. Processing may begin with a search engine, such as the enhanced search engine 925 on the server 920, periodically crawling the network 940. The search engine 925 may use a spider (i.e., a program that crawls a network to locate publicly accessible resources, such as web pages or other documents) to locate documents on the network 940. For each document located, the search engine 925 may save a copy of it [act 1010].

When a user decides to perform a search of the network 940, the user may activate a web browser, such as the browser 320. The user may then provide one or more search terms to the browser 320 in a conventional manner [act 1020]. The browser 320 may treat the search terms as a query to a search engine, such as the search engine 925, or a web directory. The browser 320 may generate a request to query the search engine 925 using the search terms and send the request to the search engine 925 [act 1030]. In response to the request, the search engine 925 generates data that contains the search results and sends it back to the browser 320 [act 1040].

As described above, the search results may include links to documents (e.g., web pages) and possibly a textual description of the links, links to directory nodes within a hierarchical directory and possibly textual descriptions for the directory nodes, or a combination of these links.

The browser 320 receives the list of result links from the search engine 925 [act 1050]. If the list of result links takes the form of an HTML document, then the browser 320 may parse the document to determine the links that form the search results. The browser 320 may present the result links to the user in a conventional manner [act 1060].

The user may then select one of the links to retrieve a document corresponding to the link. The user may make the selection, for example, by clicking on one of the links using a pointer, such as a mouse pointer. The browser 320 detects the link selection and notifies the search engine 925 of which link has been selected [act 1070].

The search engine 925 may then retrieve its saved copy of the document, highlight the search terms in the document, and present the highlighted document to the browser 320 instead of or in addition to the unhighlighted document [act 1080]. For example, the search engine 925 may search the document to locate the search terms. Then for each occurrence of the search terms, the search engine 925 may change one or more characteristics of the word(s), such as the font, style, size, color, effect, etc. Upon receiving the document, the browser 320 may provide the highlighted document to the user [act 1090].

In another implementation consistent with the present invention, the search engine 925 performs the highlighting function off-line. In this case, the search engine 925 may highlight the search terms in the documents corresponding to all of the result links, or a predetermined number of result links, and transmit the highlighted documents, or a predetermined number of the highlighted documents, to the browser 320. Alternatively, the search engine 925 may wait for the user to select one of the links before transmitting the highlighted document(s) to the browser 320.

While the foregoing acts have been described as being performed by the server 720, the acts may be performed by one of the servers 730 in other implementations consistent with the present invention.

CONCLUSION

Systems and methods, consistent with the present invention, highlight search terms in retrieved documents to aid a user in determining the relevance of the documents and locate relevant information within the documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 6, 8, and 10, the order of the acts may be modified in other implementations consistent with the present invention.

Also, two separate network configurations have been described with regard to FIGS. 1 and 9. Other configurations or a combination of configurations may occur in other implementations consistent with the present invention.

The scope of the invention is defined by the claims and their equivalents.

What is claimed is:

1. A device, comprising:
   a memory to store instructions; and
   a processor to execute the instructions in the memory to:
      provide a tool bar within a web browser application window, the tool bar including a button, for activating a highlighting operation, and an input box,
      present a document within the web browser application window,
      receive a search term within the input box of the tool bar after presenting the document within the web browser application window,
      receive selection of the button to activate the highlighting operation after receiving the search term within the input box,
      change, without user intervention and in response to receiving the selection of the button, a characteristic of the search term in the document, presented within the web browser application window, to form a modified document, and
      present the modified document, where an occurrence of the search term, within the modified document, has the changed characteristic.

2. The device of claim 1, where, when changing a characteristic of the search term, the processor is to:
   identify each occurrence of the search term in the document, and
   for each occurrence of the search term, alter a characteristic of the search term in the document.

3. The device of claim 2, where, when altering a characteristic of the search term, the processor is to change at least one of a color, font, style, effect, or size of the search term in the document.

4. The device of claim 1, where the document includes a list of search results, and where each of the search results includes a link to a search result document; and
   when changing a characteristic of the search term, the processor is to:
   alter a characteristic of the search term in one of the links when the search term occurs in the one of the links.

5. The device of claim 1, where the document includes a list of search results, and where each of the search results includes a link to a search result document and text associated with the search result document.

6. The device of claim 5, where, when changing a characteristic of the search term, the processor is to:
   identify an occurrence of the search term in the text corresponding to one of the search results, and
   change a characteristic of the search term in the text corresponding to the one of the search results.

7. A method performed by a device, comprising:
   providing, on a display associated with the device, a web browser application window that includes an input box and a button to initiate a highlighting operation;
   presenting a document within the web browser application window on the display;
   receiving one or more characters within the input box after presenting the document within the web browser application window;
   receiving selection of the button to initiate the highlighting operation after receiving the one or more characters within the input box;
   automatically locating and highlighting occurrences of the one or more characters within the document presented within the web browser application window in response to receiving the selection of the button; and
   presenting the document with the highlighted one or more characters on the display.

8. The method of claim 7, where automatically locating and highlighting occurrences of the one or more characters includes:
   identifying each occurrence of the one or more characters in the document, and
   for each occurrence of the one or more characters, changing a characteristic of the one or more characters in the document.

9. The method of claim 8, where changing a characteristic of the one or more characters includes:
   altering at least one of a color, font, style, effect, or size of the one or more characters in the document.

10. The method of claim 7, where the document includes a web page.

11. The method of claim 7, where the document includes a list of search results.

12. A computer-readable memory device containing computer-executable instructions, comprising:
   one or more instructions to provide a tool bar within a web browser application, the tool bar including a search box and a button to activate a highlighting operation;
   one or more instructions to present a document within a window of the web browser application;
   one or more instructions to receive one or more characters within the search box of the tool bar after presenting the document within the window of the web browser application;
   one or more instructions to receive selection of the button to activate the highlighting operation after receiving the one or more characters within the search box of the tool bar;
   one or more instructions to locate and highlight, in response to receiving the selection of the button to activate the highlighting operation, occurrences of the one or more characters within the document presented within the window of the web browser application to create a modified document; and one or more instructions to present the modified document within the web browser application, where the modified document includes the highlighted occurrences of the one or more characters.

13. The computer-readable memory device of claim 12, where the one or more instructions to locate and highlight occurrences of the one or more characters includes:
   one or more instructions to identify each occurrence of the one or more characters in the document, and
   one or more instructions to change, for each occurrence of the one or more characters, a characteristic of the one or more characters in the document.

14. The computer-readable memory device of claim 13, where the one or more instructions to change a characteristic of the one or more characters includes one or more instructions to alter at least one of a color, font, style, effect, or size of the one or more characters in the document.

15. The computer-readable memory device of claim 12, where the document includes a web page.

16. The computer-readable memory device of claim 12, where the document includes a list of search results.

* * * * *